United States Patent [19]

Tosi

[11] 4,278,152
[45] Jul. 14, 1981

[54] CONTROL MECHANISM FOR DISC BRAKES

[75] Inventor: Pierre G. Tosi, Pont-a-Mousson, France

[73] Assignee: Pont-A-Mousson S.A., Nancy, France

[21] Appl. No.: 68,361

[22] Filed: Aug. 21, 1979

[30] Foreign Application Priority Data

Aug. 24, 1978 [FR] France ................................. 78 24755

[51] Int. Cl.³ ............................................ F16D 65/56
[52] U.S. Cl. .................................. 188/71.9; 188/72.8; 188/196 BA
[58] Field of Search ..................... 188/71.9, 72.6, 72.8, 188/72.9, 106 F, 196 BA

[56] References Cited

U.S. PATENT DOCUMENTS

| 3,292,739 | 12/1966 | Ulbing | 188/71.9 |
| 3,851,737 | 12/1974 | Hewins | 188/71.9 |
| 4,180,146 | 12/1979 | Airheart | 188/71.9 |

Primary Examiner—Duane A. Reger
Attorney, Agent, or Firm—Sughrue, Rothwell, Mion, Zinn and Macpeak

[57] ABSTRACT

Mechanical control carried by a floating caliper 3 with friction pads 9a, 9b around a brake disc 1.

A system A of drum cams 16–17 with four helicoidal inclined faces joined in pairs to transform a rotation movement of a control lever 11 into a translation movement imparted to friction pads 9a, 9b so that they clamp on disc 1.

The drum cams make it possible to transform and amplify the rotation drive movement imparted by the control lever. Application to heavy vehicles, tractors, road equipment, etc.

14 Claims, 6 Drawing Figures

U.S. Patent    Jul. 14, 1981    Sheet 2 of 2    4,278,152
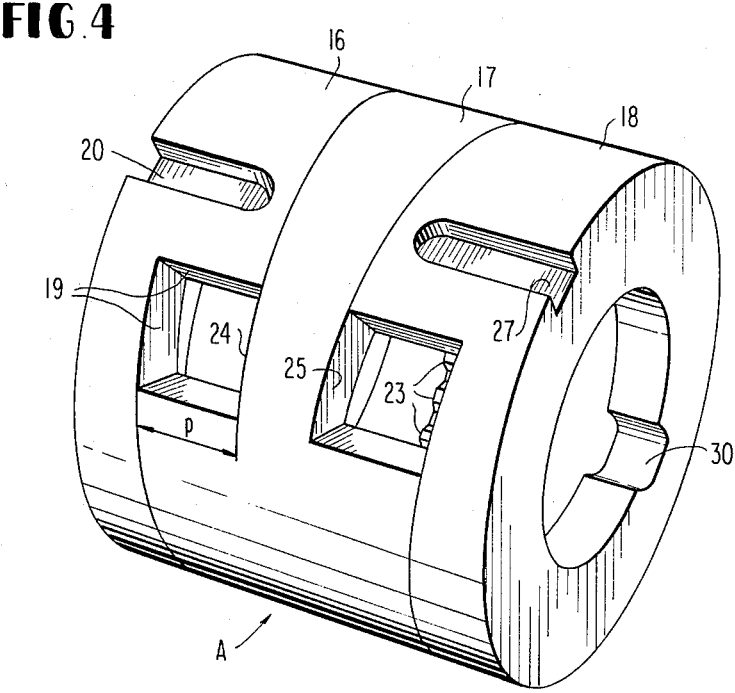
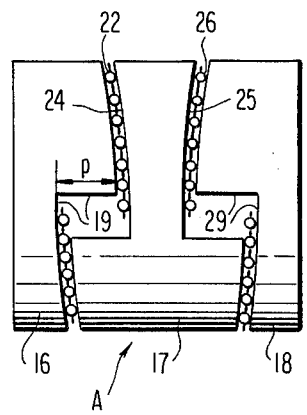
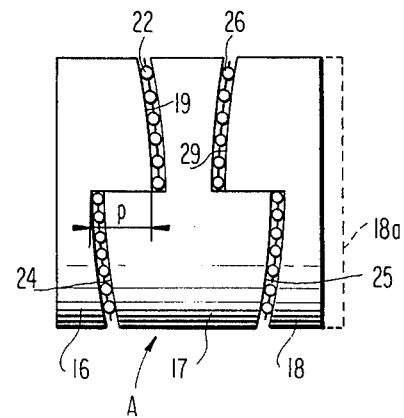

CONTROL MECHANISM FOR DISC BRAKES

This invention relates to a disc brake control mechanism applicable particularly, but not exclusively, to heavy autovehicles.

More particularly, the invention relates to a mechanical control of the type wherein the braking or friction pads carried by a floating caliper on both sides of the disc to be braked are clamped onto this disc by the action of a lever causing the relative turning of a system of drum cams or cylindrical cams with pair helicoidal inclined faces to obtain an axial movement and a thrust on a friction pad to clamp the two opposite pads on the disc.

The invention is also of the known type wherein an automatic system for compensation of the wear of the friction pads, of the nut-screw and idle travel type and a one-direction clutch is interposed between the drum cam system and a friction pad.

According to the known art, the drum cam system consists of a pair of cams with paired helicoidal inclined faces one of which is absolutely stationary and the other able to turn in relation to the first, which produces an axial movement that is transmitted to a friction pad by the wear compensation system for said pad.

When it is desired to increase the axial clamping force of the brake or friction pads, it is advantageous and known to interpose a needle thrust bearing between the helicoidal inclined faces or sides of the cams. But, to make it possible for this needle thrust bearing, made up of an annular bearing race cut and deformed along a helicoidal surface, to function under satisfactory conditions, it is necessary to limit the angle of rotation of the rotary cam to a rather slight value. The axial clamping travel is then limited. Moreover, an additional reason limits this angle of rotation: the travel of the operating jack of said lever is itself limited so that the jack functions under satisfactory conditions.

Further, in the case where considerable axial travel is necessary to apply the friction pads on the disc, it would be possible to envisage choosing a greater screw pitch for the cam inclined faces and needle thrust bearing. But this solution has to be ruled out because, on the one hand, it is not possible to excessively deform the cut annular race of the needle thrust bearing, and, on the other hand, machining of the inclined cam faces would become more difficult.

This invention solves the problem of increasing the axial clamping travel with the use of a needle thrust bearing without increasing the angle of rotation or the pitch of the cams and without excessively increasing the size and weight of the braking mechanism.

SUMMARY OF THE INVENTION

The invention therefore has for its object a disc brake control mechanism with a floating caliper. The caliper comprises a stationary shoe carrying a friction pad on a face of a rotary disc and a mobile shoe carrying a friction pad on the other face of the disc. The mechanism is of the articulated drive lever type driving a helicoidal inclined face in rotation in relation to another of a pair of helicoidal inclined faces that is stationary and rests on the former by a helicoidal needle thrust bearing, and thus axially moving a friction pad toward the disc to be clamped by an automatic wear compensation system while the other friction pad also approaches the disc. This mechanism is characterized in that it comprises three drum cams with four paired helicoidal inclined faces, one cam being connected to a friction pad by an automatic wear compensation system known in itself.

According to a characteristic of the invention, the first drum cam carriers a single helicoidal inclined face and is totally stationary, the second drum carries two symmetrically opposite helicoidal inclined faces and is rotary and mobile in translation in relation to the first stationary cam, while the third drum cam, symmetric with the first, is provided with a single helicoidal inclined face paired with the adjacent inclined face of the second drum cam, said third cam being fixed in rotation but not in translation.

Thanks to the three drum cams with a total of four helicoidal inclined faces, when the second turns a certain angle in relation to the first stationary one, it causes an axial drive movement to which is added the axial movement of the third cam under the action of its helicoidal inclined face with the adjacent inclined face of the second median rotary drive cam.

In other words, the second rotary cam or median cam with two helicoidal inclined faces amplifies, by doubling it, the axial movement obtained with the inclined face of the first stationary cam.

Thus there is obtained an axial movement of the friction pad that is double that which would be obtained with known systems, without modifying the pitch of the helicoidal inclined faces or the diameter of the drum cams or the length of the drive lever or its angle of clearance.

Other characteristics and advantages will come out during the following description.

BRIEF DESCRIPTION OF THE DRAWINGS

In the accompanying drawing, given solely by way of example:

FIG. 4 is a perspective view of the three drum cams brought together;

FIGS. 5 and 6 are diagrammatic elevation views of three drum cams respectively in the applied and released positions.

GENERAL STRUCTURE OF THE BRAKING SYSTEM

Figure 1:
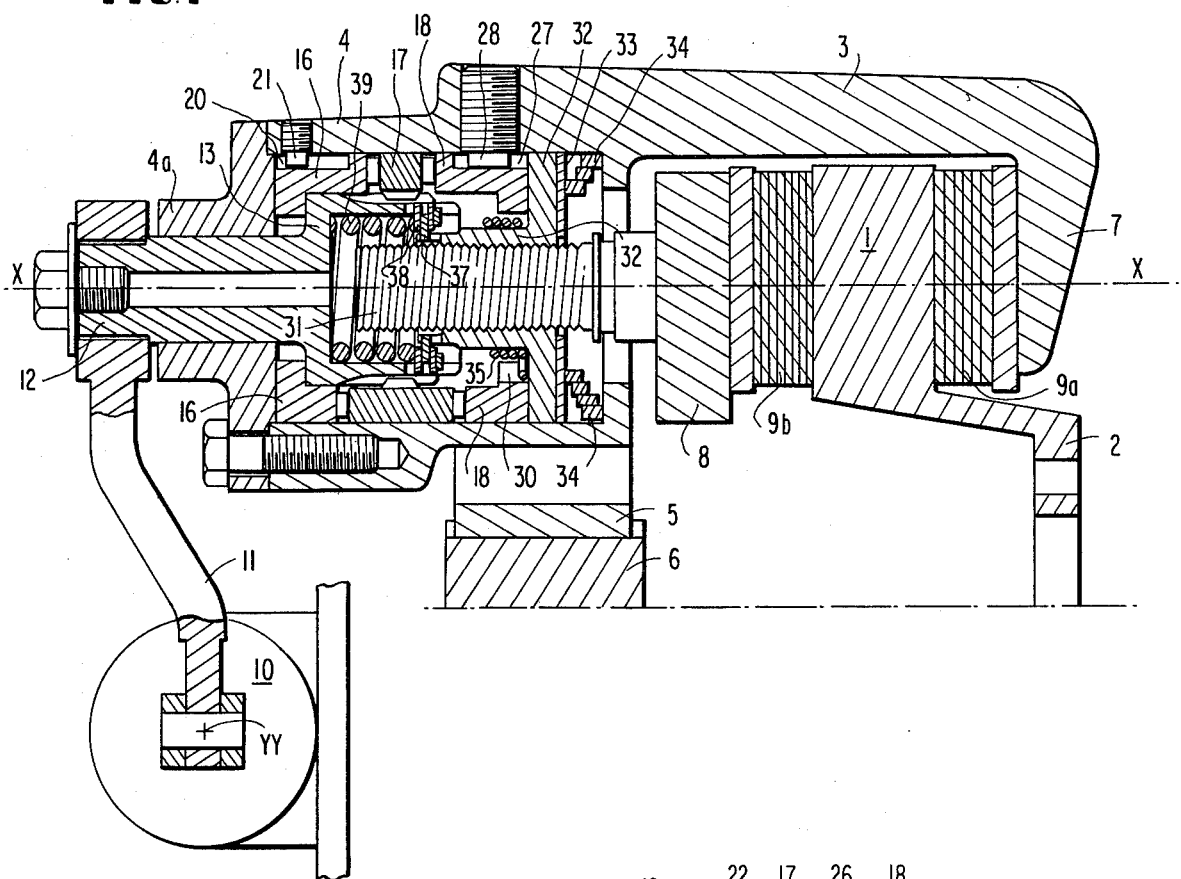
FIG. 1 is a diagrammatic view of a section of a control mechanism according to the invention in the applied position of the disc brake.
Figure 2:
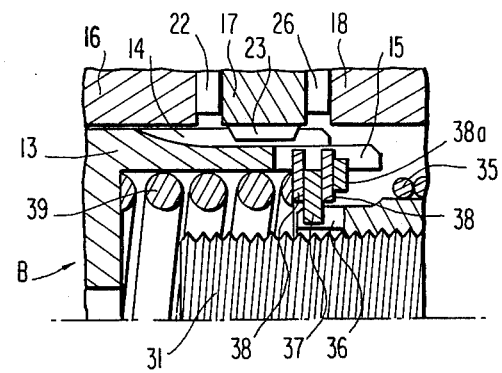
FIG. 2 is a partial detailed view in section, on a larger scale than FIG. 1, of the wear compensation system.
Figure 3:
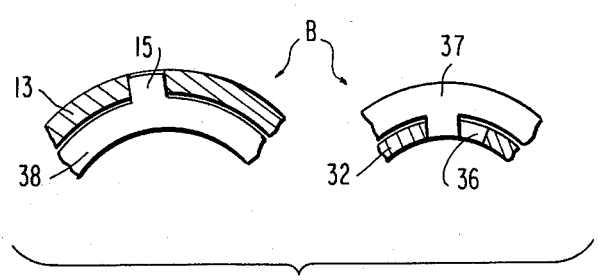
FIG. 3 is a partial view of the organs of the wear compensation system.

According to the example of the embodiment of FIG. 1, the invention is applied to the control mechanism of a disc brake. Rotary disc 1, with two acting plane surfaces, is carried by a flange 2 fastened, as known, by bolts to a flange solid with a stationary journal shaft. This assembly is well known in an autovehicle and has not been shown. The braking mechanism is carried by a floating caliper 3, which is mounted around brake disc 1 so as to have a degree of play in a direction of axis XX perpendicular to the two active surfaces of disc 1.

For this purpose, caliper 3 is provided with a case 4 and cover 4a housing the mechanism, comprises a slide 5 able to move in a groove of member 6, parallel to axis XX and carried by the dead axle not shown.

Caliper 3, thus floating, comprises a stationary shoe 7 and a mobile shoe 8 carried by the mechanism housed in case 4. Shoes 7 and 8 carry friction or brake pads 9a, 9b respectively. The active surface of brake pads 9a, 9b are mounted on both sides of disc 1 around axis XX and their active surfaces are parallel to those of disc 1.

Thanks to this known floating mounting of caliper 3 in relation to disc 1, friction pads 9a, 9b can be centered in relation to disc 1, i.e., placed equidistant both in the applied and released positions.

Control Mechanism

1. General Description (FIG. 1)

The mechanism comprises for its operation a drive jack 10 with fluid under pressure and a spring, of axis YY at right angles to axis XX. Jack 10 is carried by caliper 3, in a manner (not shown). The piston rod of jack 10 is connected to lever 11 articulated around axis XX and capable of angular clearances in a plane parallel to disc 1 and friction pads 9a, 9b. Lever 11 is keyed on hollow drive shaft 12 of axis XX going into case 4.

Drive shaft 12, described more in detail below, is solid in rotation with a system A of drum cams intended to transform the rotation movement of shaft 12 into a translation movement along the direction of axis XX and to amplify this movement according to the invention as will be seen below for transmitting it to mobile shoe 8 by a system B for automatic compensation of the wear of friction pads 9a, 9b.

2. Detailed Description (FIGS. 1, 2, 3, 4)

The control mechanism is placed around axis XX inside case 4.

Drive shaft 12 ends, inside case 4, in a hub 13, with a diameter notably greater than that of the part of the shaft 12 going through case 4a. Hub 13 comprises outside flutings 14 for driving drum cam system A in rotation. Hub 13 is notched with longitudinal slits or slots 15 (along the generatrices of hub 13) intended to work with a friction gear described below of wear compensation system B.

According to the invention, drum cam system A comprises three cams 16, 17, 18 with a total of four paired helicoidal inclined faces (FIG. 4, 5, 6).

The first drum cam 16 or base cam, known in itself, comprises an active helicoidal inclined face 19 of axis XX forming a surface at right angles to axis XX, rolled 360° around this axis, with a pitch p that can be seen by the axial difference in distance p between the beginning and end of said inclined face 19, i.e., between its two ends. Cam 16 is completely immobilized both in translation since it is held between the expansion or shoulder of hub 13 and cover 4a, and in rotation since it comprises an outside notch 20 in which fits, without play, a radial stop pin 21 going through case 4. As is known, a needle thrust bearing 22 is applied against helicoidal inclined face 19 and placed between base cam 16 and adjacent drum cam or medium rotary cam 17.

Second drum cam 17 or median rotary cam comprises, on the inside, flutings 23 (FIG. 1 and 4) paired with flutings 14 of hub 13, and meshed with the latter to be driven in rotation by drive shaft 12. Cam 17 is provided with two symmetrical helicoidal inclined faces 24 and 25 of each of its end sections. Inclined face 24 is paired with inclined face 19 from which it is separated by needle thrust bearing 22 and has the same pitch p and the same rolling direction. Symmetrical inclined face 25 has the same pitch but a rolling direction opposite that of inclined faces 19 and 24. A helicoidal needle thrust bearing 26 similar to bearing 22 but symmetrical with it, therefore with the same pitch and opposite rolling direction, is placed between second cam 19 and third adjacent cam 18.

Second drum cam 17 is mounted to rotated inside case 4 which acts as its bore.

Third drum cam 18 or the cam for transformation and amplification of the movement is immobilized in rotation, but not in translation in case 4 by a straight outside notch 27, extended along a generatrix, in which a radial stop 28 engages. Cam 18 can slide in translation in relation to pin 28. On its face facing second cam 17, cam 18 carries a helicoidal inclined face 29 of the same rolling direction and same pitch as inclined face 27 of cam 17. Finally, cam 18 carries an inside support and stop notch 30 in rotation as will be seen below.

Unit B for automatic compensation of wear of friction pads 9a, 9b, well known in itself, comprises the following members (FIGS. 1, 2, 3) that are, in an original and advantageous way, mounted on the inside of hollow cams 16, 17, 18:

a system with screw 31 with axis XX, fixed in translation with mobile shoe 8 and nut 32, which makes it possible, by relative rotation in a single direction, when pads 9a, 9b are worn, to take up the wear. The threads of screw 31 and nut 32 are irreversible. A single-direction device which will be discussed below makes possible the rotation of nut 32 in the compensation direction but prevents it rotation in the opposite direction.

Screw 31 is immobilized in rotation by a means (not shown) for example, by being made solid with shoe 8. Screw 31 is free in translation.

Nut 32 is provided with a flange on which third drum cam 18 rests on one side and a support plate 33 and a coil recall spring spring 34 on the other side, the spring itself resting on an inside shoulder of case 4. Nut 32, when it does not turn, is fixed in translation with screw 31. Nut 32 acts as a support for a friction coil spring 35 hooked by one end on inside stop notch 30 of cam 18 which immobilizes it in rotation. Spring 35 is wound so that due to its deformation, it allows the rotation of nut 32 in one direction which is that of wear compensation but prevents rotation of the nut in the opposite direction. Thus, spring 35 is equivalent to a single-direction clutch or a free wheel.

In view of its being driven in rotation, nut 32 (FIG. 2 and 3) comprises at least two slots 36 in which are engaged, with striking, diametrically opposite inside radial pins, of a disc 37 which is mounted idle in relation to hub 13 of drive shaft 12. Disc 37 is sandwiched between two coaxial friction discs 38, of axis XX, with outside radial pins engaged in slots 15 of hub 13. Friction discs 38 are mounted idle in relation to nut 32. A Circlip 38a, engaged on hub 13, acts as a support for disc 38. A spring 39 applies discs 38 against intermediate disc 37 so that only by friction of discs 37 and 38 can hub 13 of drive shaft 12 drive nut 32 in rotation. Spring 39 rests, on the one hand, against a disc 38 and, on the other hand, against the bottom of hub 13.

Discs 37 and 38 and spring 39 consequently constitute a friction clutch between hub 13 and nut 32.

To complete the description of automatic wear compensation system B it should be noted that a pair of slots, for example, slots 36 are wider than the corresponding pins or tongues 37 with a striking therebetween corresponding to axial play of pads 9a, 9b in relation to disc 1.

Functioning (FIG. 1, 2, 3, 5 and 6)

Assume that friction pads 9a, 9b are to be clamped on disc 1. It will be assumed that no play is to be taken up, since the arrangement and function of wear compensation system B mentioned above are well known.

1. Released Brake

In the beginning, the braking control mechanism is in released position, friction pads 9a, 9b, assumed not worn, being separated from disc 1 and recall spring 34 shoving support plate 33 against the flange of nut 32 which itself is applied against third drum cam 18.

Unit A of three drum cams 16, 17, 18 is, because of the position of lever 11, in retracted position (FIG. 6). Inclined faces 19, 24, 25, 29 are in contact by their plane end sections with offset according to pitch p.

2. Application of Brake

Lever 11 is maneuvered by jack 10 so as to clamp friction pads 9a, 9b against brake disc 1.

The rotation of lever 11 causes the rotation of shaft 12, its hub 13 and, by the pair of flutings 14 and 23 (FIG. 2), rotation of median drum cam 17 in relation to first cam 16 which remains stationary. By sliding on needle thrust bearing 22, inclined face 24 of cam 17 moves in relation to inclined face 19 of cam 16 from the position of FIG. 6 to the position of FIG. 5. This rotation of cam 17 a fraction of a turn is reflected by an axial movement of helicoidal inclined faces 19 and 24 along axis XX of cam 17 a fraction of pitch p. Other inclined face 25 of cam 17 thus moves a fraction of pitch p while turning and sliding on needle thrust bearing 26 which separates it from inclined face 29 of third drum cam 18. The latter is immobilized in rotation by pin 28 and notch 27 but can slide axially in relation to pin 28 thanks to said notch 27. Consequently, the axial movement of pitch p a fraction and rotation of inclined face 24 cause an additional axial movement of third drum cam 18 a fraction of pitch p. Since helicoidal inclined faces 19, 24, 25, 29 are in this example, of the same diameter and same rolling pitch, the simple axial movement of median drive cam 17 causes a double axial movement of driven cam 18.

In its turn the axial movement of cam 18, double that of cam 17 (cam 18 comes into position 18a represented in broken lines in FIG. 6), moves the flange of nut 32, support plate 33, presses down on the spring of plate 34 and, by irreversible bond of nut 32 with screw 31, axially moves screw 31 the same amount as cam 18 and brings mobile shoe 8 toward brake disc 1, thus clamping friction pad 9b on disc 1. Since caliper 3 is floating, by the reaction of pad 9a, it is centered around disc 1, and the application of the brakes is performed.

3. Releasing of the Brake

To come back to the released brake position, the spring of jack 10 brings lever 11 to its initial position. Shaft 12 therefore makes hub 13 and cam 17 turn in the opposite direction by the pair of flutings 14 and 23. Cam 17 comes a fraction of pitch p to cam 16, and cam 18, under the pressure of recall spring 34 by means of support plate 33 of the flange of nut 32, in turn comes toward cam 17 to come back in the position of FIG. 6 by axially moving twice as much as cam 17.

In this translation in the opposite direction a double value of that of cam 17, nut 32 carries along the small axial course screw 31 and the latter carries mobile shoe 8 which moves away from disc 1. Floating caliper 3 is balanced on both sides of disc 1 and the brake is released.

It should be noted that if there were wear of brake pads 9a, 9b to be compensated, system B would have functioned as follows: upon application, after a rotation of each disc pin 17 corresponding to the striking of slots 36 (FIG. 3) and striking of the pin against an active side of each slot 36, clutch 37, 38 makes nut 32 turn and thus moves screw 31 and pads 9a, 9b in a supplementary movement which is added to that obtained by the direct thrust of cam 18 on nut 32.

When the axial load appears (contact of pads 9a, 9b with disc 1), clutch 37, 38 slips and the cams continue their action of movement on nut 32 for application.

Upon release, clutch 37, 38 slips when each disc pin 37 comes to strike on the other active side of each slot 36, i.e., on the other striking side which is afforded it. Nut 32 cannot turn because free wheel spring 35 prevents it.

Advantages

The presence of three cams 16, 17, 18 and the total of four inclined faces 19, 24, 25 and 29 is advantageous because it makes it possible to amplify the axial travel of the clamping of brake pads 9a, 9b without increasing the pitch of the helicoidal surfaces or the angle of rotation of lever 11 in relation to the known art. The interposition of two needle thrust bearings 22–26 between the three cams 16, 17, 18 makes it possible to transmit a considerable axial load.

Moreover, the symmetry of the helicoidal inclined faces 24 and 25 and of inclined faces 19 and 29 and of drum cams 16 and 18 offer an advantage: that of being able to reverse the roles and positions of rings 16 and 18 by using the mechanism of the invention of a left brake instead of a right brake (opposite wheel).

Finally, the fact of housing wear compensation system B inside cams 16, 17, 18 instead of interposing it between cam 18 and nut 32 on the outside of cam 18 makes possible a notable saving or reduction of the axial bulk.

I claim:

1. A disc brake control mechanism for a brake disc, said mechanism comprising a floating caliper, said caliper comprising a stationary shoe, including a friction pad facing one face of the disc, a mobile shoe carrying a friction pad facing the other disc face, an articulated drive lever, driving means including opposed helicoidal inclined faces operatively coupled to said articulated drive lever for moving at least said mobile shoe friction pad relative to the disc to effect braking, helicoidal needle thrust bearings interposed between said helicoidal inclined faces, and an automatic wear compensation system for said driving means, the improvement wherein said driving means comprises three drum cams defining four paired helicoidal inclined faces, one of said cams being operatively coupled to one of said friction pads by said automatic wear compensation system such that the four paired helicoidal inclined faces function to amplify the axial travel of said brake pads without an increase in pitch of the helicoidal surfaces or the angle of rotation of said lever while permitting the mechanism to be arbitrarily employed as an operating mechanism for a left or right brake of a vehicle.

2. The mechanism according to claim 1, wherein said first drum cam carries a single helicoidal inclined face, said second drum cam carries two helicoidal inclined faces symmetrically opposite and on respective ends thereof, said third drum cam is symmetrical with the first drum cam, and is provided with a single helicoidal inclined face, said second drum cam has its helicoidal inclined faces paired with adjacent inclined faces of said first drum cam and said third drum cam, respectively, and wherein said mechanism includes means for maintaining said first drum cam stationary, means for mounting said second drum cam for rotation about its axis and mobile in translation in relation to said first stationary cam and means for immobilizing said third drum cam in rotation but not in translation, wherein said automatic wear compensation system is operatively coupled to said mobile shoe.

3. The mechanism according to claim 1, wherein said drive lever is mounted to a drive shaft, a hub is integral with said drive shaft and includes outside flutings and wherein said second rotary drum cam is provided with inside flutings operatively engaging said outside flutings of said hub.

4. The mechanism according to claim 1, wherein said first drum cam includes a longitudinal slot oriented along a generatrix of the cylindrical cam, said mechanism includes a case, said case bearing a shoulder, and a radial pin fixed thereto and engageable within said longitudinal slot to immobilize said first drum cam in rotation, and a shoulder formed between said drive shaft and said hub and engageable with the shoulder of said case for immobilizing said first drum cam in translation.

5. The mechanism according to claim 1, wherein said mechanism further comprises a case, said third drum cam includes a longitudinal slot oriented along a generatrix of said cylindrical cam, and wherein said radial pin is engageable within said longitudinal slot for immobilizing said drum cam in rotation.

6. The mechanism according to claim 1, wherein said first drum cam includes an outside cylindrical surface, and further includes an active surface crosswise to its axis, and wherein said crosswise surface having the shape of a helicoidal inclined face rolling about said axis, rolled 360° around said axis with a pitch (p) concretized by an axial offset of the pitch distance between the beginning and end of said inclined face.

7. The mechanism according to claim 1, wherein said second drum cam is provided with two helicoidal inclined faces symmetrically on each of their end sections, and at right angles to the axis of said second drum cam.

8. The mechanism according to claim 6, wherein one of the helicoidal inclined faces of said second drum cam is paired with the helicoidal inclined face of said first drum cam, with an identical pitch and the same direction rolling around the drum axis.

9. The mechanism according to claim 6, wherein the other inclined face of said second drum cam is of the same pitch but having a rolling direction opposite to that of the one inclined face of said first cam and relative to the inclined face of said first cam.

10. The mechanism according to claim 1, wherein said third cam is provided on its end facing the second cam with a helicoidal inclined face of the same pitch and same direction of rolling as the inclined face of said second cam.

11. The mechanism according to claim 1, wherein said needle thrust bearings are interposed respectively between helicoidal inclined faces at opposite ends of said second drum cam, said needle thrust bearings being mounted in helicoidal races of the same pitch and same rolling direction to the paired helicoidal inclined faces at opposite ends of second drum cam.

12. The mechanism according to claim 2, wherein one of said drum cams is mobile in translation but not in rotation, and wherein said mechanism automatic wear compensation system includes a single-direction clutch, and wherein said drum cam which is mobile in translation but not in rotation is provided with an inside notch acting as a support and stop for said single-direction clutch.

13. The mechanism according to claim 2, wherein said automatic compensation system is interposed between the hub of the drive shaft driven by the drive lever and said mobile shoe carrying the friction pad proximate to said drive lever.

14. The mechanism according to claim 12, wherein the automatic wear compensation system comprises a screw and nut means, a friction clutch interposed between said drive shaft and said nut, and wherein said single-direction clutch is applied to said nut and is housed on the outside of said drum cams.

* * * * *